(12) United States Patent
Bird et al.

(10) Patent No.: US 7,137,656 B2
(45) Date of Patent: Nov. 21, 2006

(54) LATCH MECHANISM

(75) Inventors: James D. Bird, Oak Ridge, NC (US); Karl Duckett, Oak Ridge, NC (US)

(73) Assignee: Volvo Trucks North America, Inc, Greensboro, NC (US)

( * ) Notice: Subject to any disclaimer, the term of this patent is extended or adjusted under 35 U.S.C. 154(b) by 165 days.

(21) Appl. No.: 10/830,642

(22) Filed: Apr. 23, 2004

(65) Prior Publication Data

US 2005/0236845 A1    Oct. 27, 2005

(51) Int. Cl.
   *E05B 15/02*    (2006.01)
(52) U.S. Cl. .................. 292/341.12; 292/340
(58) Field of Classification Search .......... 292/341.11, 292/341.14
   See application file for complete search history.

(56) References Cited

U.S. PATENT DOCUMENTS

| | | | | |
|---|---|---|---|---|
| 1,741,258 A | * | 12/1929 | Utley | 292/341.11 |
| 1,861,579 A | * | 6/1932 | North | 292/335 |
| 2,987,336 A | * | 6/1961 | Kramer | 292/52 |
| 3,281,176 A | * | 10/1966 | McKey | 292/216 |
| 3,371,948 A | * | 3/1968 | Alfonsas | 292/216 |
| 3,572,797 A | | 3/1971 | Shay | |
| 3,591,225 A | | 7/1971 | Hagemeyer | |
| 4,165,112 A | * | 8/1979 | Kleefeldt | 292/216 |
| 4,911,488 A | * | 3/1990 | Brackmann et al. | 292/216 |
| 5,826,672 A | * | 10/1998 | Holter et al. | 180/69.21 |
| 6,149,210 A | * | 11/2000 | Hunt et al. | 292/216 |

FOREIGN PATENT DOCUMENTS

| | | |
|---|---|---|
| EP | 0894918 | 2/1999 |
| EP | 1275802 | 1/2003 |
| EP | 1005599 | 7/2003 |

\* cited by examiner

*Primary Examiner*—Gary Estremsky
(74) *Attorney, Agent, or Firm*—Martin Farrell

(57) ABSTRACT

A latch assembly for connecting a hood assembly to a truck includes a striker bolt that is surrounded by a sleeve that is engaged by a rotary latch. The sleeve is of shorter length than the striker bolt so that it can slide along the striker bolt. The rotary latch fixedly engages the sleeve so that any relative motion between the hood and frame translates to movement of the sleeve along the striker bolt rather than between the rotary latch and striker bolt. The sleeve arrangement thus provides wear protection to rotary latch, allows for self alignment of the hood and fender assembly along the striker bolt axis and dynamic movement of the latch during vehicle operation.

15 Claims, 5 Drawing Sheets

_US 7,137,656 B2_

LATCH MECHANISM

TECHNICAL FIELD

The invention relates generally to the field of latches and more specifically to a latch striker assembly.

BACKGROUND OF THE INVENTION

Heavy duty over the highway trucks are typically equipped with a single piece hood and fender assembly that pivots on hinges connected to the front of the frame rails. Many techniques are used for fixing the rear portion of the hood and fender assembly in the closed position. For example on some trucks simple elastomeric bands are stretched between the rear of the hood and fender assembly and the cab.

U.S. Pat. Nos. 6,637,531 and 6,394,211 which are assigned to the assignee of the present invention, disclose a mounting system that uses latches mounted on struts connected to the frame rails to fix the rear portion of the hood and fender assembly in the closed position while isolating the hood and fender assembly from the operator cab. The system described in those patents addresses several problems associated with the connection between the hood and fender assembly and the truck. Flexure of the truck body that translates into movement of the hood and fender assembly can be transmitted to the operator cab causing vibration and noise. To mitigate the effects of hood and fender assembly movement on the cab, the patented system mounts the hood and fender assembly directly to the vehicle frame to isolate the cab from the hood and fender assembly.

Another challenge related to the rear connection of the hood and fender assembly to the truck is that the connecting means needs to allow for variations in the position of the hood and fender assembly along the frame rails or with respect to the cab due to tolerance stack up, dynamic loading while the vehicle is in use, and also changes in hood and fender geometry as the assembly wears. This issue is addressed by the patented system by providing a conical shaped bracket that engages the latch pin and guides it into engagement with the keeper.

SUMMARY OF THE INVENTION

A latch mechanism for connecting two vehicle panels features a bolt surrounded by a slidable sleeve that is engaged by a keeper mechanism. The sleeve is free to slide along the bolt after engagement by the keeper. This sliding arrangement reduces wear on the striker assembly, allows the panels to self align along the axis of the bolt, and allows for dynamic movement along the axis of the bolt during operation of the vehicle.

According to one embodiment, a striker bolt is suspended at each of two distal end mounting points by mounting structure that defines a distance between the distal end mounting points. An outer sleeve loosely surrounds the striker bolt. The outer sleeve has a length less than the distance between the striker bolt distal end mounting points and the outer sleeve slidably engages the striker bolt such that the sleeve is free to slide along the length of the striker bolt between the distal end mounting points. A keeper assembly engages the outer sleeve to frictionally retain the outer sleeve in a fixed position relative to the keeper assembly.

In an exemplary embodiment, an inner sleeve spans the distance between the striker bolt distal end mounting points to surround the striker bolt in a fixed position relative thereto. Accordingly, the outer sleeve loosely surrounds the inner sleeve such that the outer sleeve is free to slide along the length of the inner sleeve between the striker bolt distal end mounting points.

According to a feature of one embodiment, the inner sleeve is made of a hardened steel. The outer sleeve may include a keeper retaining flange that prevents the keeper assembly from losing contact with the outer sleeve due to sliding motion. In an exemplary embodiment, the keeper assembly is a rotary latch that has a compliant sleeve engaging surface. According to one embodiment, the striker bolt is connected to a vehicle hood and fender assembly and the keeper is mounted to a vehicle frame. According to another embodiment, the striker bolt is connected to a vehicle hood and fender assembly and the keeper is mounted to a vehicle cab.

These and other objects of the invention will become understood from a detailed description of an exemplary embodiment of the invention which is described in conjunction with the accompanying drawings.

DETAILED DESCRIPTION OF THE PREFERRED EMBODIMENT

Figure 1:
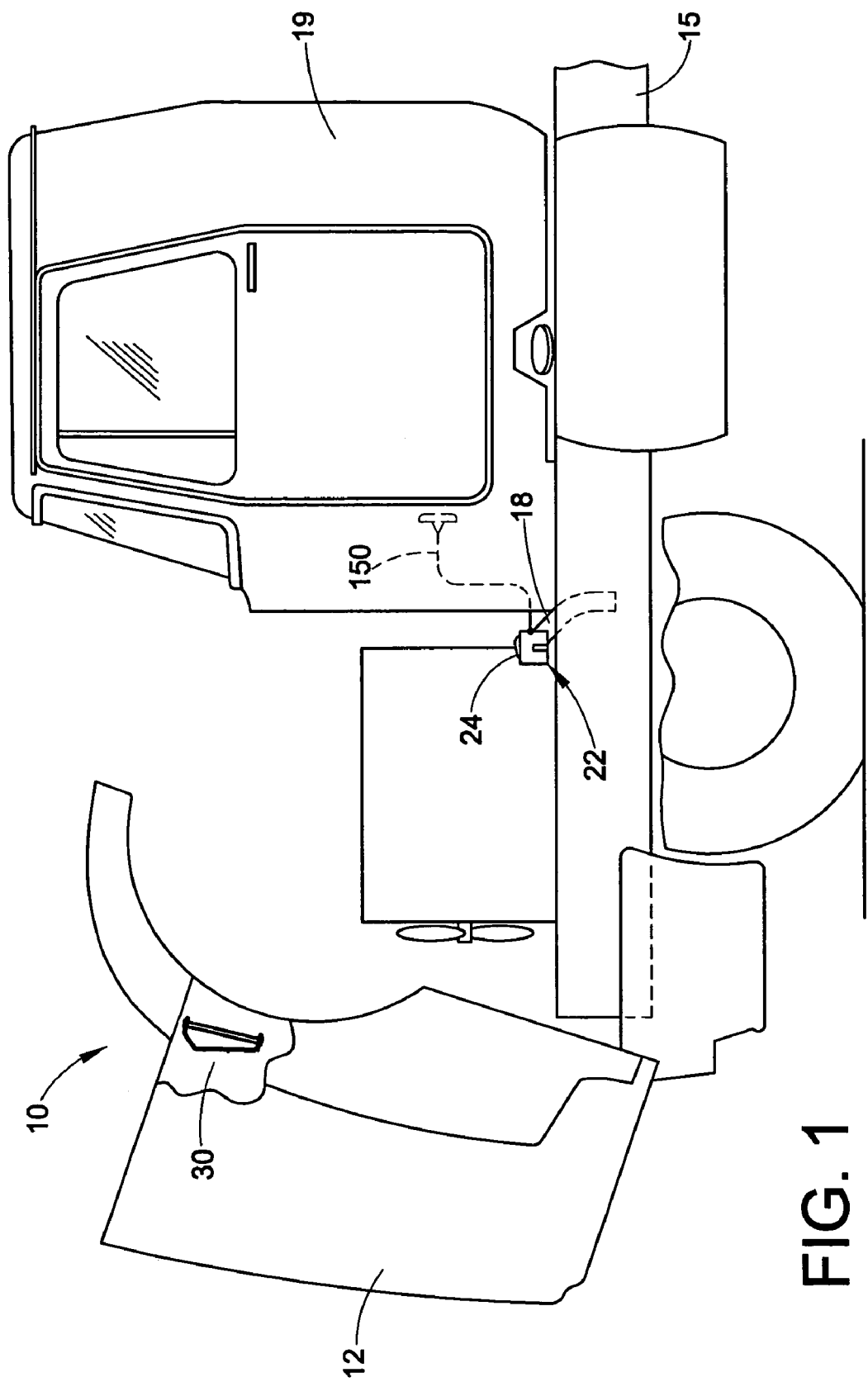
FIG. 1 is a side view of a heavy duty truck that includes a latch mechanism in accordance with one embodiment of the present invention.

Referring now to FIG. 1, a simplified cut away view of a front end 10 of a heavy duty over the highway truck is illustrated. An integral hood and fender assembly 12 pivots about the front most end of frame rails 15, one of which is shown. The hood and fender assembly encloses the truck engine when in the closed position. The hood and fender assembly 12 is suitably held in the closed position by a pair of latches (only one shown) each having a striker assembly 30 connected to the hood and fender assembly and a rotary latch assembly 22 mounted on a mounting strut 18 that is connected to the frame rail 15. It is contemplated that any suitable number of latches may be employed to hold the hood and fender assembly in position and therefore the use of two latches is for the purposes of this description only.

Figure 5:
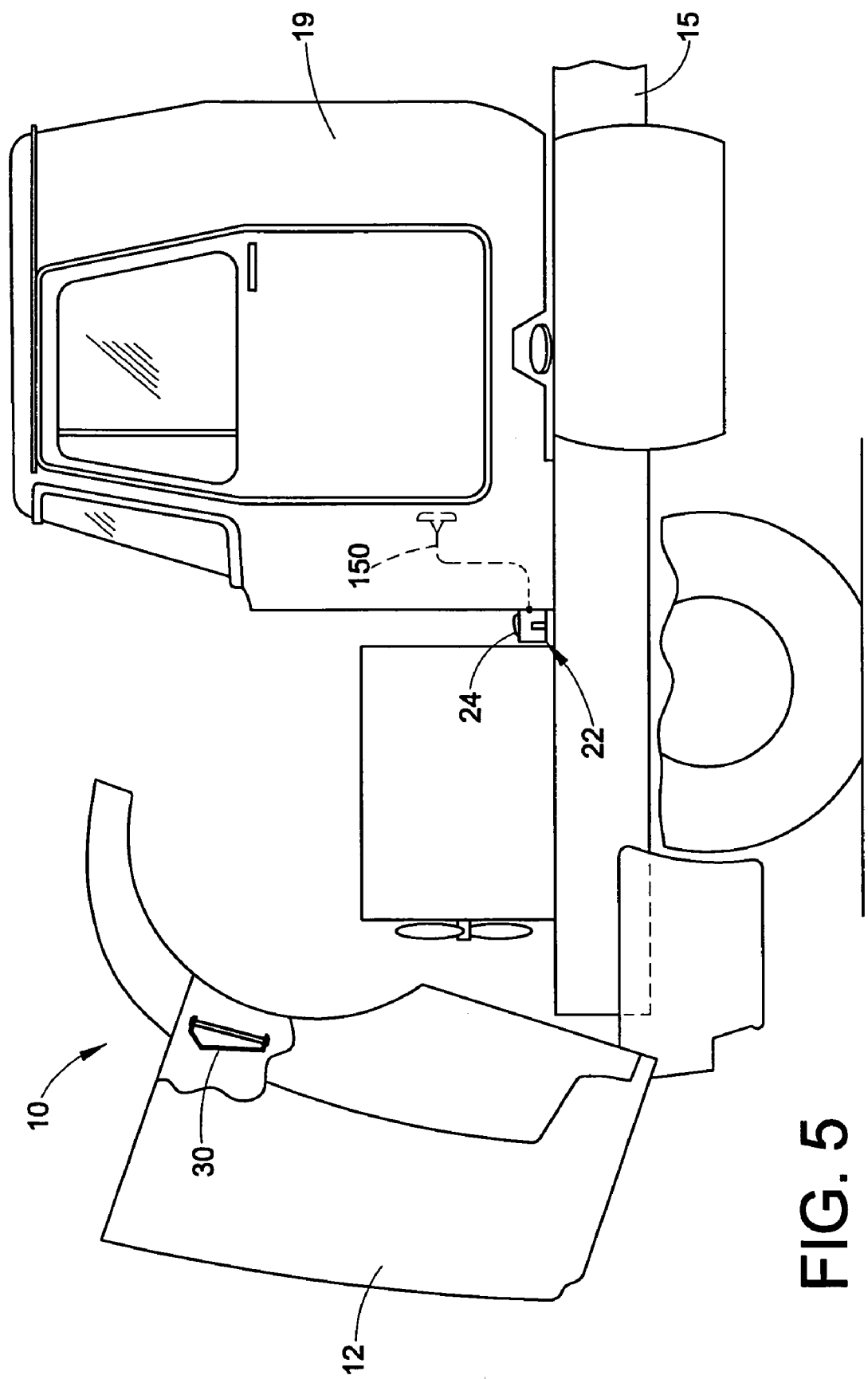
FIG. 5 is a cut away side view of an alternative embodiment of a latch mechanism according to the present invention.

An alternative embodiment is shown in FIG. 5, in which the rotary latch assembly 22 is mounted directly to an operator cab 19. In this embodiment, the mounting bracket 24 is welded or bonded to the cab.

Figure 2:
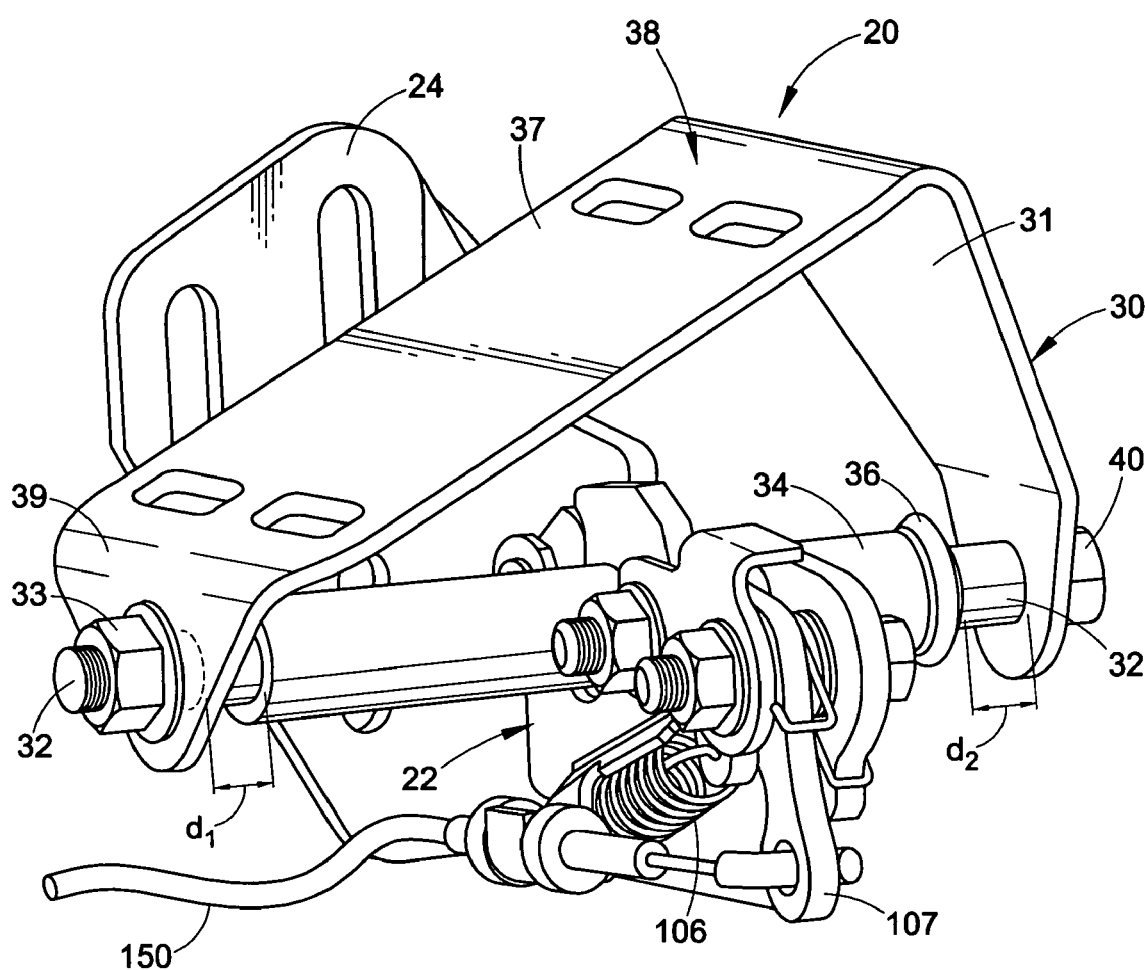
FIG. 2 is a perspective view of the latch mechanism of FIG. 1.

FIG. 2 is a more detailed view of the latch 20 that holds the hood and fender assembly in the closed position. The latch 20 includes a rotary latch assembly indicated generally as 22. The rotary latch assembly 22 has a mounting bracket 24 that is connected to the mounting strut 18 shown in FIG. 1 or the cab 19 as shown in FIG. 5. A set of co-acting pawls (described in more detail below with reference to FIG. 3)

grip a slidable sleeve 34 on the striker assembly 30 to maintain the hood in the closed position. To release the latch, a release pawl 107 is rotated to release the latch's hold on the sleeve 34. The release pawl is actuated by a cable 150 that is accessible to the operator as shown in FIGS. 1 and 5. When the cable is pulled the release pawl pivots, causing the rotary latch to disengage the sleeve 34.

The striker assembly 30 is mounted to the hood via a bracket 38. The bracket features a mounting surface 37 that is formed between extending legs 31, 39 that include mounting holes at distal ends for a striker bolt 32 that is enveloped by the slidable sleeve 34. The rotary latch assembly 22 engages the sleeve 34 at a point along its length. Once the rotary latch has engaged the sleeve, any relative motion between the hood and frame along the striker bolt axis is translated into sliding movement of the sleeve 34 along the bolt 32. The maximum travel of the sleeve 34 is defined by the difference between the length of the sleeve and the distance spanned by the striker bolt 32 between the mounting legs 31, 39 ($d_1$ and $d_2$ in FIG. 2). In one embodiment, the distance spanned by the striker bolt is 140 mm and the length of the sleeve is 115.4 mm. A raised lip 36 prevents the rotary latch assembly 22 from moving along the sleeve 34 to a point at which it is out of engagement with the sleeve. The striker assembly will be described in greater detail below in connection with FIG. 4.

Figure 3:
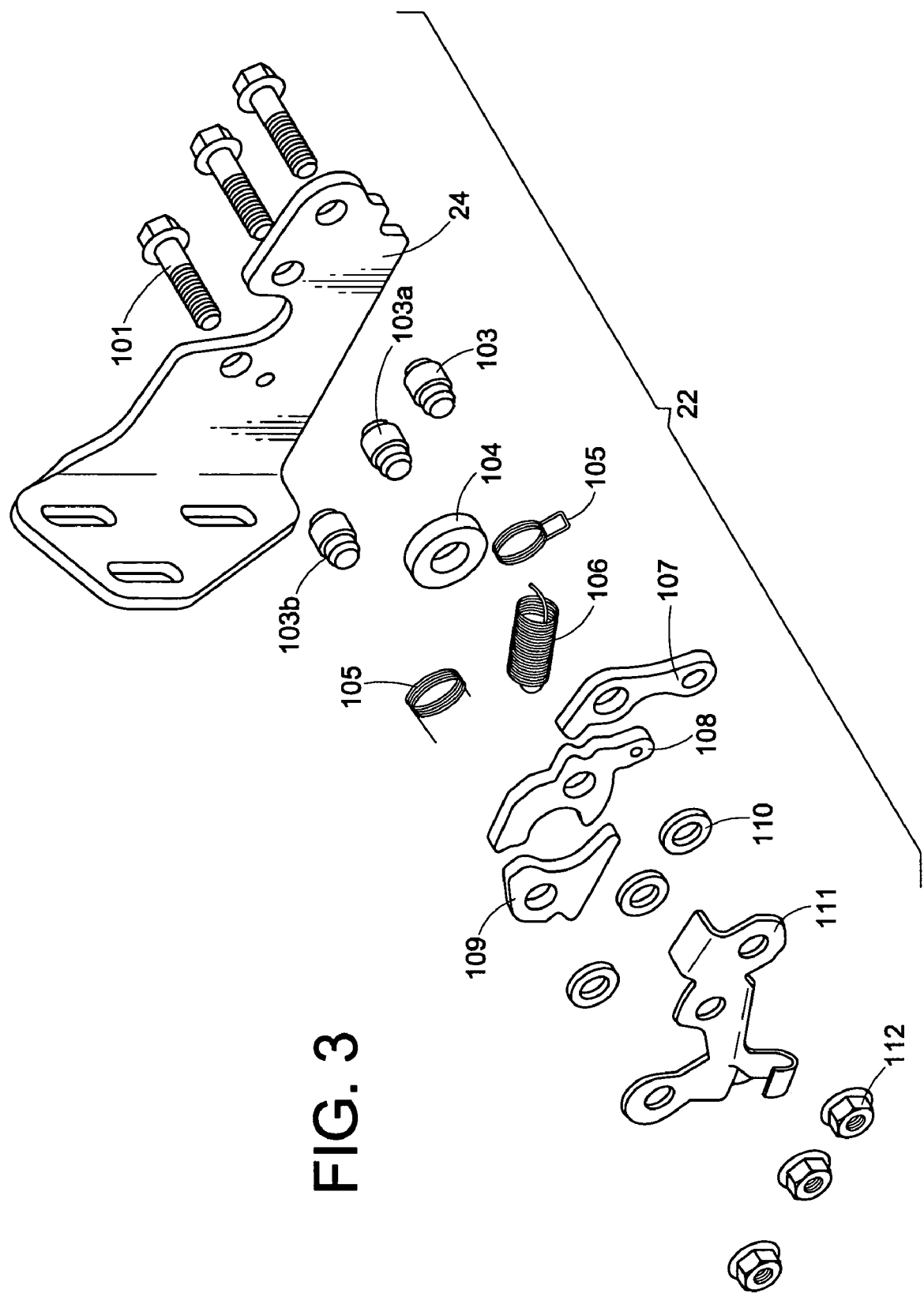
FIG. 3 is an exploded view of the latch assembly shown in FIG. 2.

The rotary latch assembly 22 is a standard rotary latch that those of skill in the art will recognize. As such, most features of the rotary latch need no description herein, however a few components have been adapted to optimize the rotary latch for use with the striker assembly 30. FIG. 3 is an exploded view of the rotary latch assembly 22. The rotary latch assembly is connected to the frame mounted strut or cab support structure with bracket 24. A set of co acting pawls 109, 108, 107 move relative to one another against the force of biasing springs 105 in response to actuation of the release cable 150 that is supported by a release cable bracket 111 to release the striker assembly. Each pawl is located on the bracket 24 by a smaller diameter 103b of spacers 103 that are threaded onto bolts 101. Washers 110 are also mounted on the bolts 101 to space the pawls apart from the release bracket. Nuts 112 are threaded onto the bolts to lock the bracket 24, spacers 103, pawls 107, 108,109, washers 110, and release bracket 111 into position.

An assist spring 106 exerts a force tending to eject the striker assembly 30 from the rotary latch assembly 22 when the release mechanism is actuated. The release pawl 107 is moved by the release cable and acts upon the other pawls 108, 108 to create an opening large enough for the striker sleeve 34 to pass out of the rotary latch assembly 22. The center spacer has an elastomeric washer 104 pressed around a large outer diameter 103a. The outer diameter of this washer 104 compresses under the force of the striker assembly being contained between the latch pawls 108 and 109 when the hood is closed. While the hood is closed, the washer 104 creates a friction lock between the striker sleeve and the rotary latch. The friction lock essentially eliminates any relative motion between the rotary latch pawls 108, 109 and the striker sleeve, thereby reducing wear on the rotary latch pawls 108, 109.

Figure 4:
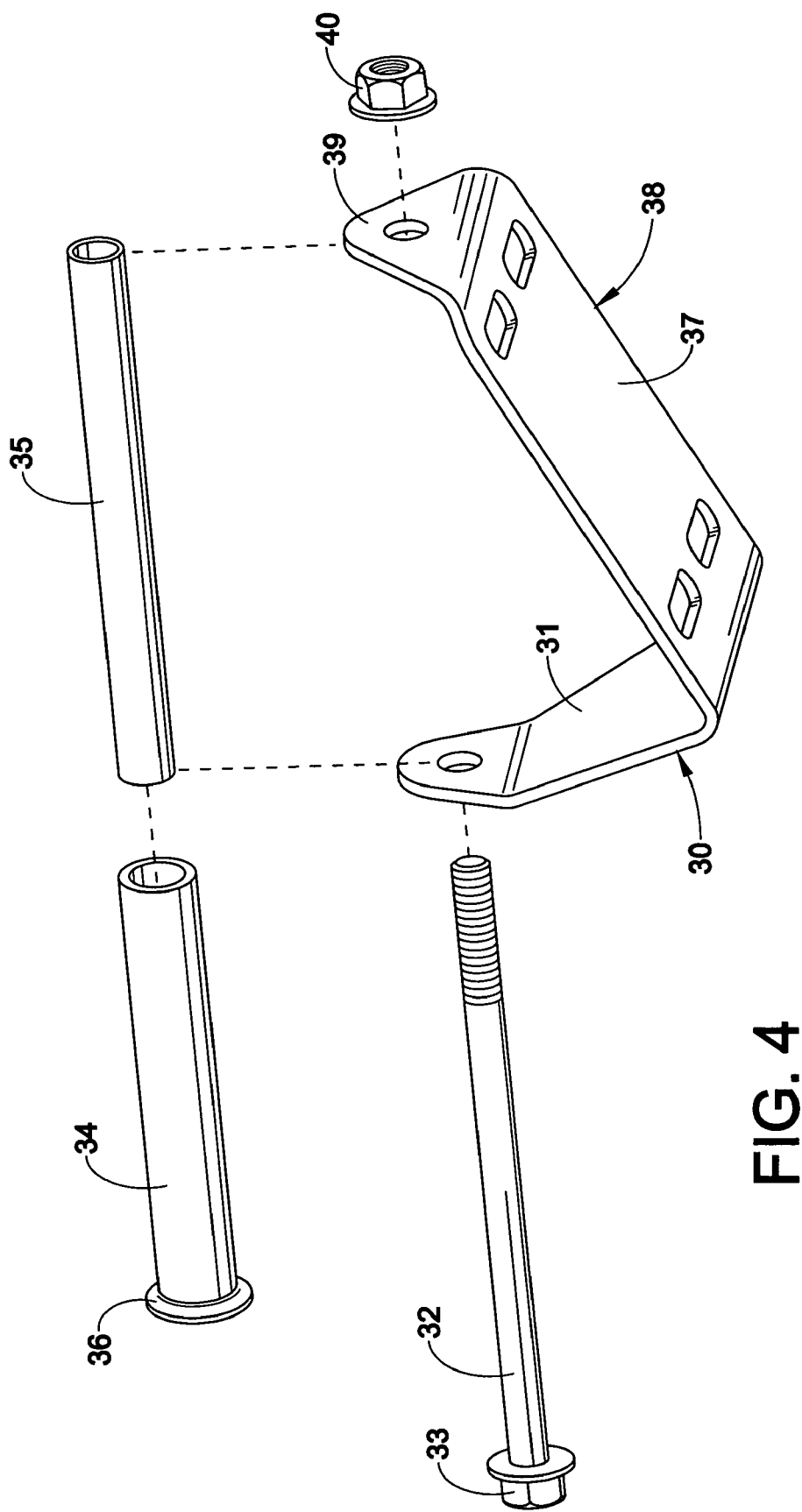
FIG. 4 is an exploded view of the latch striker assembly shown in FIG. 2.

The rotary latch 22 interacts with the striker assembly 30 to releasably retain the striker assembly. FIG. 4 is an exploded view of the striker assembly 30. The mounting bracket 38 includes the mounting surface 37 that connects to the hood. The bracket 38 has extending legs 31, 39 that include holes that accept the striker bolt 32. In the described embodiment, the striker bolt has a hex shaped head and washer like flange 33 formed at one end. Alternatively, the striker bolt could be a rivet with a separate washer. The striker bolt 32 protrudes through the ears on the mounting bracket 37 and is held in place with a nut 40 that is threaded onto the end of the striker bolt. A spacer 35 closely surrounds the striker bolt 32 along the length of the striker bolt 32 that is located between the mounting ears. A sleeve 34 surrounds the spacer 35. The sleeve is shorter than the spacer 35 to allow for dynamic movement of the rotary latch relative to the striker assembly 30. The sleeve 34 is therefore rotatable and slideable relative to the spacer 35, and the sleeve provides an outer surface that is adapted to allow the sleeve 34 to slide along its length. A raised lip 36 is formed on the striker sleeve 34 to prevent the pawls 108, 109 of the rotary latch do not slip of the striker 34 in the case of significant relative movement between the hood and the vehicle frame. The lip 36 is shown on one side of the striker sleeve 34, however a similar lip may be formed on either or both sides of the striker sleeve as well depending on the application of the latch.

Referring to FIGS. 2–4, The rotary latch 22 retains the striker sleeve 34 with no relative movement therebetween. The rotary latch 22 can engage the striker sleeve 34 at any location along its length, allowing for the variation in the relative position between the hood and the vehicle frame. Because the elastomeric washer 104 is the point of contact between the rotary latch 22 and the sleeve 34 rather than the pawls 107, 108, 109, wear on the sleeve and pawls is reduced as well as noise. During vehicle operation, the striker sleeve 34 is free to slide along the spacer 35 to provide a movable connection between the hood and fender assembly without wear on the rotary latch components.

Although the present invention has been described with a degree of particularity, it is the intent that the invention include all modifications and alterations from the disclosed design falling within the spirit or scope of the appended claims.

We claim:

1. A vehicle latch assembly comprising:
    a striker bolt suspended at each of two distal end mounting points by mounting structure that defines a distance between the striker bolt distal end mounting points;
    an outer sleeve loosely surrounding the striker bolt having a sleeve length less than the distance between the striker bolt distal end mounting points and where the outer sleeve slidably engages the striker bolt such that the outer sleeve is free to slide along the length of the striker bolt between the striker bolt distal end mounting points; and,
    a keeper assembly that engages the outer sleeve to frictionally retain the outer sleeve in a fixed position relative to the keeper assembly, wherein the outer sleeve includes a keeper retaining flange that prevents the keeper assembly from losing contact with the outer sleeve due to sliding motion.

2. The vehicle latch assembly of claim 1 wherein the keeper assembly is a rotary latch.

3. The vehicle latch assembly of claim 2 wherein the rotary latch includes a compliant sleeve engaging surface.

4. The vehicle latch assembly of claim 1 further comprising an inner sleeve that spans the distance between the striker bolt distal end mounting points to surround the striker both in a fixed position relative thereto; wherein the outer sleeve surrounds the inner sleeve such that the outer sleeve is free to slide along the length of the inner sleeve between the striker bolt distal end mounting points.

5. The vehicle latch assembly of claim 4 wherein the inner sleeve is made of a bearing material.

6. A vehicle latch assembly comprising:
a striker bolt suspended at each of two distal end mounting points by mounting structure that defines a distance between the striker both distal end mounting points;
an inner sleeve that spans the distance between the striker bolt distal end mounting points to surround the striker bolt in a fixed position relative thereto;
an outer sleeve having a second length less than the first length that surrounds the inner sleeve such that the outer sleeve is free to slide along the length of the inner sleeve between the striker bolt distal end mounting points;
a rotary latch that engages the outer sleeve to frictionally retain the outer sleeve in a fixed position relative to the rotary latch; and,
a retaining flange attached to the outer sleeve that prevents the rotary latch from losing contact with the outer sleeve due to sliding motion.

7. The vehicle latch assembly of claim 6 wherein the rotary latch includes a compliant sleeve engaging surface.

8. The vehicle latch assembly of claim 6 wherein the inner sleeve is made of a bearing material.

9. A vehicle latch assembly for releasably maintaining a pivotable hood in a closed position in which the hood is connected to a frame of an over-the-highway truck, comprising:
a mounting bracket having a mounting surface with two legs extending from opposite ends of the mounting surface, the mounting surface being connectable to the hood;
a striker bolt suspended at each of two distal end mounting points by the mounting bracket legs;
an outer sleeve surrounding the striker bolt having a sleeve length less than the distance between the striker bolt distal end mounting points and wherein the outer sleeve slidably engages the striker bolt such that the outer sleeve is free to slide along the length of the striker bolt between the striker bolt distal end mounting points; and
a keeper assembly connected to the vehicle that engages the outer sleeve to frictionally retain the outer sleeve in a fixed position relative to the keeper assembly when the hood is moved to the closed position,
wherein the outer sleeve includes a keeper retaining flange that prevents the keeper assembly from losing contact with the outer sleeve due to sliding motion.

10. The vehicle latch assembly of claim 9 wherein the keeper assembly is a rotary latch.

11. The vehicle latch assembly of claim 10 wherein the rotary latch includes a compliant sleeve engaging surface.

12. The vehicle latch assembly of claim 9 further comprising an inner sleeve that spans the distance between the striker bolt distal end mounting points to surround the striker both in a fixed position relative thereto; wherein the outer sleeve surrounds the inner sleeve such that the outer sleeve is free to slide along the length of the inner sleeve between the striker bolt distal end mounting points.

13. The vehicle latch assembly of claim 12 wherein the inner sleeve is made of hardened steel.

14. The vehicle latch assembly of claim 9 wherein the keeper assembly is connected to the vehicle frame.

15. The vehicle latch assembly of claim 11 wherein the keeper assembly is connected to a vehicle cab.

* * * * *